Figure 1:
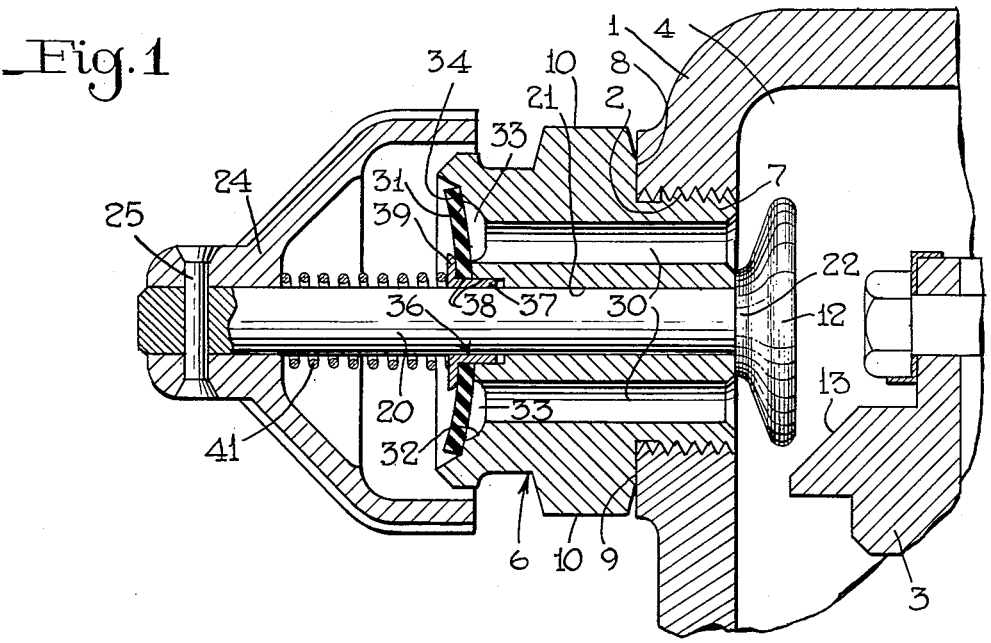

May 29, 1956 C. J. SEKERA 2,747,609
ACCELEROMETER TESTING DEVICE
Filed Aug. 21, 1951

INVENTOR.
*Charles J. Sekera*
BY
*Frank E. Miller*
ATTORNEY

# United States Patent Office 2,747,609
Patented May 29, 1956

2,747,609
ACCELEROMETER TESTING DEVICE

Charles J. Sekera, Denver, Colo., assignor to Westinghouse Air Brake Company, Wilmerding, Pa., a corporation of Pennsylvania Application August 21, 1951, Serial No. 242,945

1 Claim. (Cl. 137—560)

This invention relates to testing devices, and more particularly to a relatively simple, inexpensive testing device for permanent but removable attachment within the exhaust port of a rotary inertia device, of the type shown and described in detail in United States Patent No. 2,531,054, issued to Cecil S. Kelley, November 21, 1950, and assigned to the assignee of the present invention, for determining whether or not the pilot valve comprised in such rotary inertia device is functioning properly.

For complete understanding of the operational characteristics of a rotary inertia device of the above mentioned type, reference may be made to the above mentioned patent, but for sake of brevity, suffice it to say, insofar as the instant case is concerned, that said rotary inertia device comprises a flywheel member mounted within a casing having an exhaust port through which fluid under pressure is vented during normal operation of said device and which exposes an outermost peripheral portion of said flywheel member when said port is open, and that, when the vehicle employing the rotary inertia device is stationary, a pilot valve comprised in said device, when in proper functional order, will vent fluid under pressure to said exhaust port to effect release of fluid under pressure from the brake cylinder with which the device is associated, when said flywheel member is turned a certain limited number of degrees in either direction out of a neutral position toward which it is biased.

Heretofore, in order to test response of the brake equipment to turning movement of the flywheel member in the rotary inertia device, it was necessary for the person conducting the test to remove a dust-excluding cover element from the exhaust port in the inertia device to gain access to said flywheel, then, after so doing, it was necessary for said person to employ such an expedient as his finger, a screw driver, or other unsuitable tool inserted into said exhaust port, as the instrument via which the turning movement was effected; an improvised procedure which jeopardized the safety of the person conducting the test and required considerable time consuming manipulation; in view of which, it is a prime object of this invention to provide a testing device which facilitates the manual turning movement of the flywheel of such a rotary inertia device for test purposes and which obviates any necessity for employment of improper tools for such purpose.

It is another object of the invention to provide such a testing device which may be permanently mounted on the rotary inertia device so as to be available for test purposes at any time without the necessity for time consuming preparatory test procedure.

Still another object of the invention is the provision of such a testing device which may be permanently but removably disposed in the existent exhaust port of the identified rotary inertia device in behalf of expediting initial installation, and which device so disposed will not interfere with the normal pilot valve discharge release function of said port during operation of the rotary inertia device.

Other objects and advantages will become apparent from the following detailed description of the invention.

Figure 2:
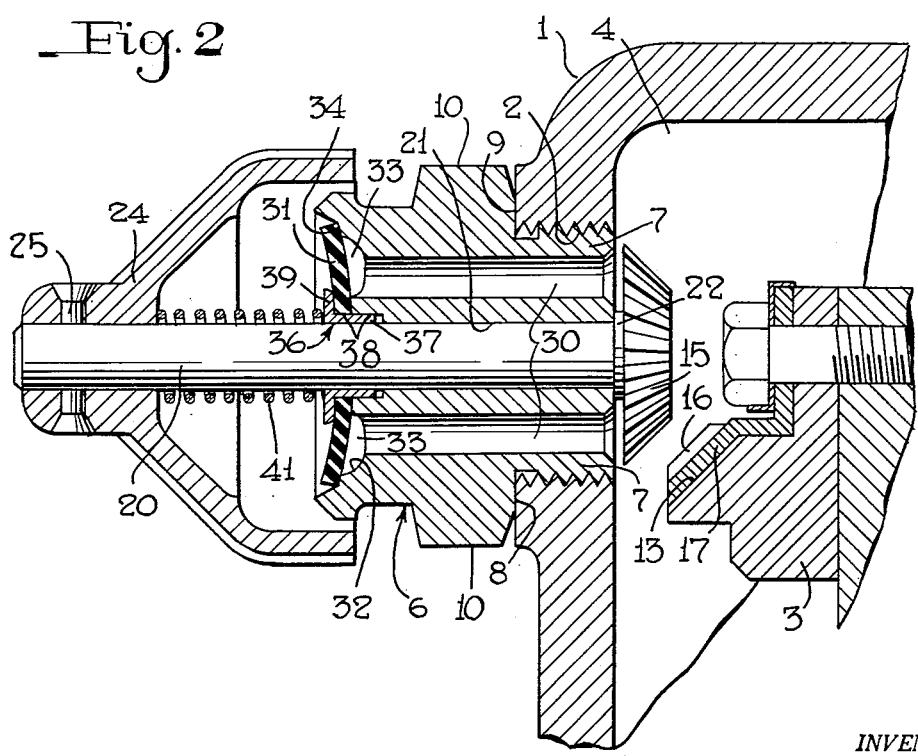

Referring to the drawing, Figs. 1 and 2 are views showing in cross-section two embodiments of the novel device for testing response of the pilot valve to movement of the flywheel member in a rotary inertia device of the aforementioned type.

Description

Referring to Figs. 1 and 2, only the portions of the rotary inertia device pertinent to an understanding of the operation of the testing device have been shown; for more detailed showing and disclosure, reference may be made to the aforementioned patent, No. 2,531,054. The rotary inertia device comprises a casing 1, the interior of which casing is open to atmosphere by way of an internally threaded exhaust port 2. Within the casing 1 is disposed a flywheel member 3 which is adapted to be operably connected by means (not shown) to a railway car axle (not shown) for synchronous rotation with the railway wheel (not shown) when said wheel is accelerated or decelerated at normal rates corresponding to rolling contact of the railway wheel on the rail, and to lag or lead the railway wheel a certain number of degrees in response to excessive acceleration or deceleration of the railway wheel corresponding to impending slipping or sliding of the wheel on the rail under influence of excessive driving or braking force for a particular adhesive condition between wheel and rail. Extreme limits of lagging or leading movement of the flywheel member 3 relative to the wheel is arranged to cause unseating of a pilot valve (not shown) to admit fluid under pressure to a chamber 4 defined by the interior of the casing 1 and open to the exhaust port 2.

When the railway wheel is stationary, turning of the flywheel member 3 to the extent of its movement relative to the wheel in either direction from a neutral position toward which it is biased will result in unseating of the above mentioned pilot valve if the rotary inertia device is in proper operating condition.

Both forms of the testing device embodying the invention shown in Figs. 1 and 2, respectively, comprise a fixed casing element 6 having at one end an externally threaded portion 7 for screw-threaded attachment within the internally threaded exhaust port 2 in the casing 1 of the rotary inertia device.

The threaded portion 7 of casing element 6 intersects with a transverse, radially extending stop shoulder 8 for abutting contact with a similar shoulder 9 formed in the casing 1 of the inertia device to determine the degree to which the portion 7 of element 6 may be screwed into the exhaust port 2 of the rotary inertia device, thereby defining a fixed position of element 6 when removably attached to the inertia device.

The casing element 6 of the testing device is provided with a continuous series of flat surfaces (not shown) arranged in such as a hex pattern to accommodate the usual open end wrench for turning and tightening said casing element into the exhaust port 2 of the inertia device casing 1.

In the embodiment of the invention shown in Fig. 1 there is provided a flywheel member contact element 12 in the form of a wheel or the like, the outer periphery of which is knurled for frictional driving contact with a tapered annular surface 13 formed in the outer periphery of the flywheel member 3 of the rotary inertia device. The contact element 12 is disposed within the casing 1 of the rotary inertia device at the innermost end of the exhaust port 2; the outermost diameter of contact element 12 being less than the innermost diameter of the threads in the exhaust port to allow for removal and insertion of element 12 therethrough.

In the embodiment of the invention shown in Fig. 2, a contact element 15 for turning the rotary inertia device's flywheel member 3 is provided in the form of a bevel gear arranged to be actuated into mating engagement with gear teeth 16 formed in an annular face element 17 suitably attached to the flywheel member 3 and covering the tapered face 13. Employment of a knurled wheel without modification of the flywheel member 3, as in Fig. 1, is preferred over the bevel gear and tapered annular rack structure of Fig. 2.

In each of the embodiments of the testing device shown in Figs. 1 and 2, respectively, the respective contact element 12, 15 is attached to one end of a rod 20 rotatably and slidably mounted in a central bore 21 extending longitudinally through the casing element 6. An integral hub 22 on the respective contact element 12, 15 engages the end of the element 6 exposed to chamber 4 to define a repose position of said contact element within chamber 4 in which it is disposed a certain distance away from the flywheel member 3 or face element 17, as the case may be. The opposite end of the rod 20 projects beyond the outer end of the bore 21 and is provided with a handle 24 attached thereto by means of such as a rivet 25 extending through transverse aligned openings in rod and handle. The handle 24 is cup-shaped and so arranged that its open end fits around the outermost projecting end of the element 6 to shield the rod 20 at the outermost entrance to bore 21 from dust and dirt, etc.

In order to assure that mounting of the testing device in the exhaust port 2 of the rotary inertia device does not interfere with exhaust of fluid under pressure from chamber 4 during operation of said rotary inertia device, the element 6 of the testing device is provided with a plurality of exhaust ports 30 which extend longitudinally from chamber 4 at its one end to the interior of the cup-shaped handle 24 at its opposite end.

At the end of element 6 covered by the hollow handle 24, a check valve 31 is provided to allow for exhaust of fluid under pressure from chamber 4 via the exhaust ports 30 to atmosphere, and preventing flow in the reverse direction to exclude dust and dirt from the interior of the rotary inertia device's casing 1.

An annular recess 32 is formed in element 6 which cooperates with check valve 31 to define an annular chamber 33 connecting respective ends of exhaust ports 30 one with the other.

An annular seat shoulder 34 encircles recess 32 to accommodate the check valve 31 which is in the form of a disc of resilient material having an inner face proportioned for sealing seating engagement at its outer periphery with shoulder 34.

A retaining element 36 comprises a sleeve portion 37 fit loosely around the rod 20 and extending through respective aligned central openings 38 in the check valve 31 and element 6, and a radial flange 39 at the outermost end for cooperation with the casing element 6 to retain the check valve in proper position.

To bias the respective contact element 12 or 15, as the case may be, to a repose position in which both are shown in the drawing out of contact with the flywheel member 3 or attached face element 17, whichever applies to the case, and to cause a clamping action between flange 39 and element 6 to be imparted to the check valve 31 to urge the latter to assume its preflexed seated position in which it is shown in the drawing, a respective compression return spring 41 is provided, disposed within protective cover of the handle 24, encircling the rod 20, and abutting at one end the handle 24 and at the opposite end the flange 39.

*Operation*

In operation of the testing device when mounted in the exhaust port 2 of a rotary inertia device of the type described in detail in the aforementioned United States Patent No. 2,531,044, an operator applies a pushing force to the handle 24 to overcome action of the spring 41 for sliding the rod 20 axially in the bore 21 of element 6 to bring the contact element 12 or 15, as the case may be, into engagement with the flywheel member surface 13 or face element 17, respectively, whereupon, by turning movement of the handle 24 in either direction, through the medium of rod 20 and by virtue of the contact between element 12 or 15 and the flywheel member surface 13 or face element 17, respectively, will cause corresponding turning movement of the flywheel member to the limit of its travel. If the pilot valve (not shown) in the rotary inertia device and the equipment being tested is in proper functional order at the time that the flywheel member is so moved, said pilot valve will open to release fluid under pressure to the chamber 4 and via ports 30 in element 6, the check valve 31 and the interior of handle 24, thence to atmosphere, such release from the pilot valve in turn effecting release of fluid under pressure from the brake cylinder (not shown) in the brake equipment employing the rotary inertia device, the sound of such brake cylinder release indicating to the operator that the equipment including the inertia device is properly functioning. If, on the other hand, when the flywheel member 3 is so moved by turning of handle 24 as above, and no fluid under pressure is released from the brake cylinder device, such fact will indicate to the operator that the equipment is not responding properly and the necessary steps may be taken to remedy the situation.

At completion of such test, release of the pushing force applied manually to the handle 24 will allow spring 41 to return the rod 20 and thereby contact element 12 or 15 to its repose position in which it is shown in the drawing defined by engagement of the contact element 12 or 15 with the fixed casing element 6 out of contact with the flywheel member surface 13 or face element 17, respectively. Upon termination of influence of the contact element 12 or 15 on the flywheel member 3, bias means (not shown) within the rotary inertia device will return said flywheel member to its neutral position.

Having now described my invention, what I claim as new and desire to secure by Letters Patent, is:

A testing device for a rotary inertia brake controller device of the type including a casing having a screw-threaded exhaust port extending from the exterior of the casing to an interior chamber containing a flywheel member having an annular surface in coaxial relationship therewith accessible from the exterior of said casing through said exhaust port, said flywheel member being turnable to unseat a pilot valve for releasing fluid under pressure to said chamber, said testing device comprising a casing element having a screw-threaded portion at one end for permanent attachment within said exhaust port to said casing, said casing element having a bore in coaxial relationship to said one end and also having exhaust passages arranged around said bore, which bore and passages extend longitudinally through said casing element from end to end thereof, said casing element also having at the opposite end a first annular shoulder coaxial with said bore and encircling the adjacent ends of said exhaust passages and a second annular shoulder coaxial with said first annular shoulder located between said passages and said bore and spaced inwardly of said first annular shoulder, a rod extending through and slidably mounted in said bore for rotary and axial movement relative to said casing element, an annular driving element of lesser diameter than said exhaust port to accommodate insertion therethrough for disposition within said chamber and attached to the inner end of said rod for axial movement therewith into and out of driving engagement with said annular surface, a handle disposed beyond said opposite end of said casing element and secured to the outer end of said rod for manual axial and rotary actuation thereof, an annular resilient disc disposed at said opposite end of said casing element in encirclement of said rod for contact at one side adjacent its outer peripheral edge with said first annular shoulder and for contact adjacent its inner peripheral edge with said second annular shoulder, an annular retaining element encircling said rod and engaging the opposite side of said resilient disc adjacent its said inner peripheral edge, and a coil spring encircling said rod and interposed under pressure between said retaining element and said handle for restoring the said driving element to a retracted position out of engagement with said annular surface and for maintaining engagement of said resilient disc with said second annular shoulder thereby to stress said resilient disc to cause its biased seating engagement with said first annular shoulder.

References Cited in the file of this patent

UNITED STATES PATENTS

| | | |
|---|---|---|
| 975,645 | Sherburne | Nov. 15, 1910 |
| 1,088,817 | Graham | Mar. 3, 1914 |
| 1,227,078 | Rutz | May 22, 1917 |
| 1,848,562 | Greenleaf | Mar. 8, 1932 |
| 2,531,054 | Kelley | Nov. 21, 1950 |
| 2,540,754 | Newell | Feb. 6, 1951 |